US012645980B2

US01264598OB2

(12) United States Patent
Mishra et al.

(10) Patent No.: US 12,645,980 B2
(45) Date of Patent: Jun. 2, 2026

(54) DATA META-MODEL BASED FEATURE VECTOR SET GENERATION FOR TRAINING MACHINE LEARNING MODELS

(71) Applicant: Tata Consultancy Services Limited, Mumbai (IN)

(72) Inventors: Mayank Mishra, Thane West (IN); Shruti Kunde, Thane West (IN); Sharod Roy Choudhury, Thane West (IN); Amey Pandit, Thane West (IN); Manoj Karunakaran Nambiar, Thane West (IN); Siddharth Verma, Thane West (IN); Gautam Shroff, Gurgaon (IN); Pankaj Malhotra, Noida (IN); Rekha Singhal, Thane West (IN)

(73) Assignee: Tata Consultancy Services Limited, Mumbai (IN)

( * ) Notice: Subject to any disclaimer, the term of this patent is extended or adjusted under 35 U.S.C. 154(b) by 1009 days.

(21) Appl. No.: 17/160,197

(22) Filed: Jan. 27, 2021

(65) Prior Publication Data

US 2021/0232971 A1     Jul. 29, 2021

(30) Foreign Application Priority Data

Jan. 28, 2020    (IN) .............................. 202021003759

(51) Int. Cl.
*G06N 20/00*        (2019.01)
*G06F 16/23*        (2019.01)
*G06F 16/2458*      (2019.01)

(52) U.S. Cl.
CPC ............. *G06N 20/00* (2019.01); *G06F 16/23* (2019.01); *G06F 16/2471* (2019.01)

(58) Field of Classification Search
CPC .... G06F 16/23; G06N 20/00; G06Q 30/0201; G06Q 30/0281
See application file for complete search history.

(56) References Cited

U.S. PATENT DOCUMENTS

2011/0099122 A1    4/2011  Bright et al.
2017/0313569 A1*  11/2017  Yajima ................. B67D 1/0034
(Continued)

OTHER PUBLICATIONS

Singhal, Rekha et al., "Fast Online 'Next Best Offers' using Deep Learning", Machine Learning, May 2019, Arxiv, https://arxiv.org/pdf/1905.13368.pdf.
(Continued)

*Primary Examiner* — Cesar B Paula
*Assistant Examiner* — David Tan
(74) *Attorney, Agent, or Firm* — Finnegan, Henderson, Farabow, Garrett & Dunner, LLP

(57) ABSTRACT

This disclosure relates generally to data meta model and meta file generation for feature engineering and training of machine learning models thereof. Conventional methods do not facilitate appropriate relevant data identification for feature engineering and also do not implement standardization for use of solution across domains. Embodiments of the present disclosure provide systems and methods wherein datasets from various sources/domains are utilized for meta file generation that is based on mapping of the dataset with a data meta model based on the domains, the meta file comprises meta data and information pertaining to action(s) being performed. Further functions are generated using the meta file and the functions are assigned to corresponding data characterized in the meta file. Further functions are invoked to generate feature vector set and machine learning model(s) are trained using the features vector set. Implementation of the generated data meta-model enables reusing of feature engineering code.

9 Claims, 10 Drawing Sheets

| Time-Stamp | Customer Id | Customer Name | Item Id | Item Category | Interaction type | Device | Price | Shopping Cart Items | ... |
|---|---|---|---|---|---|---|---|---|---|
| 2018-12-08 17:54:00 | 1234 | Sita | T2312 | Women Clothing | View | Laptop | Rs 550 | O2218, S3389 | ... |
| 2018-12-08 17:55:00 | 1234 | Sita | T2312 | Women Clothing | Add-to-basket | Laptop | Rs 550 | O2218, S3389 | ... |
| 2018-12-08 17:55:30 | 2000 | Rita | T2777 | Women Clothing | View | iPhone | Rs 1800 | | ... |
| 2018-12-08 17:58:00 | 1234 | Sita | T2466 | Women Clothing | view | Laptop | Rs 200 | O2218, S3389, T2312 | ... |
| ... | ... | ... | ... | ... | ... | ... | ... | ... | ... |

Layer of Abstraction (data meta-model)

User ) performs ( Action ) on ( Entity ) given ( Context )

(56) References Cited

U.S. PATENT DOCUMENTS

| | | | |
|---|---|---|---|
| 2019/0319808 A1* | 10/2019 | Fallah | H04L 9/3239 |
| 2019/0361146 A1* | 11/2019 | Roth | G01V 1/50 |
| 2020/0210881 A1* | 7/2020 | Wu | G06N 3/0455 |
| 2020/0242516 A1* | 7/2020 | Dhingra | G06N 5/043 |
| 2020/0279271 A1* | 9/2020 | Gasperecz | G06N 5/01 |

OTHER PUBLICATIONS

Vázquez-Ingelmo, Andrea et al., "Extending a dashboard meta-model to account for users' characteristics and goals for enhancing personalization", Sensor, Jul. 2020, MDPI, https://www.mdpi.com/1424-8220/20/15/4072/pdf.

Garrig'os, Irene et al., "Modelling Dynamic Personalization in Web Applications", 1Lecture Notes in Computer Science, Jun. 2003, Research Gate, https://www.researchgate.net/publication/225174238_Modelling_Dynamic_Personalization_in_Web_Applications/link/55b73e7f08aec0e5f43810e7/download.

Kandpal, Dolly et al., "A meta-model for dynamic personalization of knowledge-based systems", Lecture Notes in Computer Science, 2003, Semantic Scholar, Link: https://citeseerx.ist.psu.edu/viewdoc/download?doi=10.1.1.96.6486&rep=rep1&type=pdf.

* cited by examiner

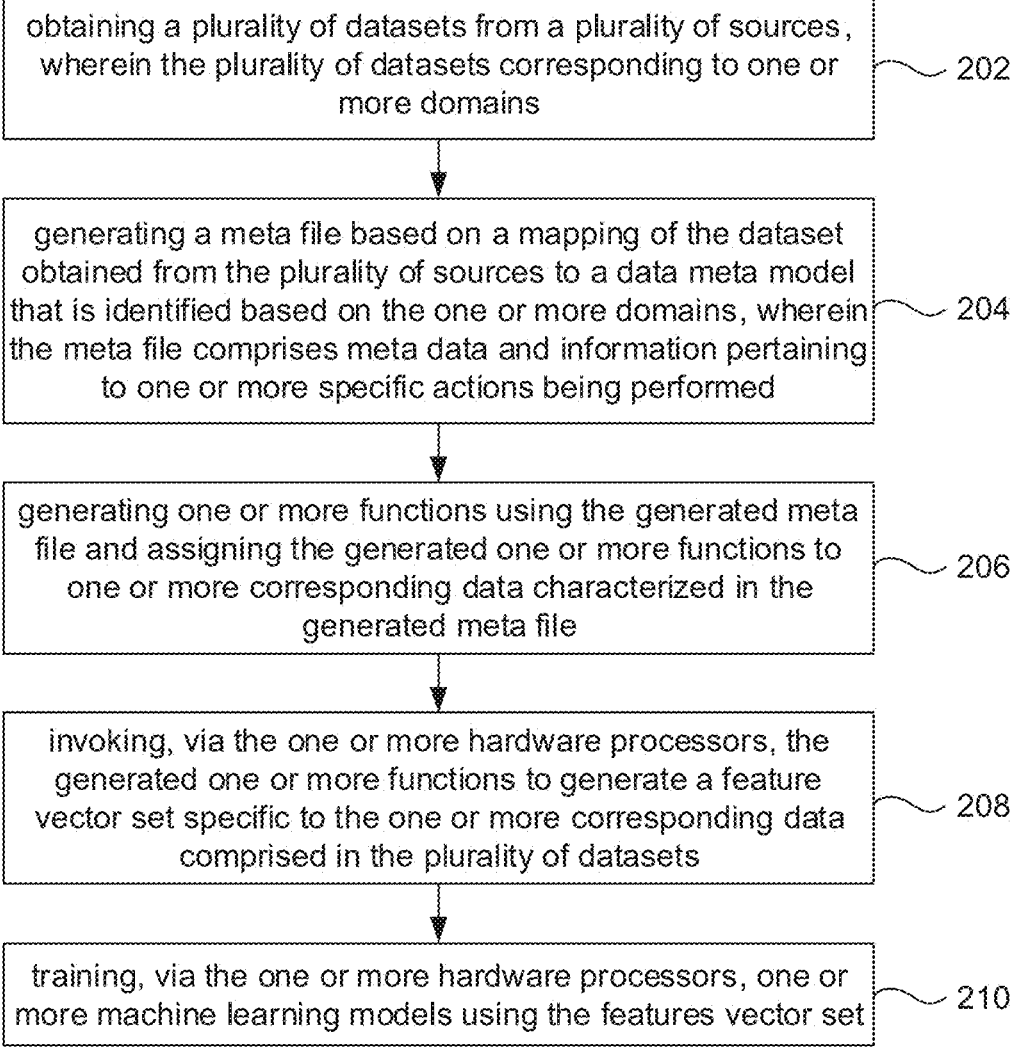

obtaining a plurality of datasets from a plurality of sources, wherein the plurality of datasets corresponding to one or more domains ⌐〜 202 generating a meta file based on a mapping of the dataset obtained from the plurality of sources to a data meta model that is identified based on the one or more domains, wherein the meta file comprises meta data and information pertaining to one or more specific actions being performed ⌐〜 204 generating one or more functions using the generated meta file and assigning the generated one or more functions to one or more corresponding data characterized in the generated meta file ⌐〜 206 invoking, via the one or more hardware processors, the generated one or more functions to generate a feature vector set specific to the one or more corresponding data comprised in the plurality of datasets ⌐〜 208 training, via the one or more hardware processors, one or more machine learning models using the features vector set ⌐〜 210

FIG. 2

| Time-Stamp | Cookie Id | Web Page | Web Page type | Category | Is-click | Device |
|---|---|---|---|---|---|---|
| ... | ... | ... | ... | | ... | ... |
| 2018-12-08 17:54:00 | 123477 | www.xyz/weerfwef.html | Advertisement | Movie | Yes | iPad |
| ... | ... | ... | ... | | | ... |

1

DATA META-MODEL BASED FEATURE VECTOR SET GENERATION FOR TRAINING MACHINE LEARNING MODELS

PRIORITY CLAIM

This U.S. patent application claims priority under 35 U.S.C. § 119 to: India application No. 202021003759, filed on Jan. 28, 2020. The entire contents of the aforementioned application are incorporated herein by reference.

TECHNICAL FIELD

The disclosure herein generally relates to feature engineering techniques, and, more particularly, to data meta-model-based feature vector set generation for training machine learning models.

BACKGROUND

Feature engineering is a critical part of any Machine Learning/Deep Learning based solution(s). The accuracy of predictions made by the trained ML/DL models directly depends on the quality of features utilized to train them. Currently, the feature engineering is done on a per data-set basis, i.e., for every given dataset to be used for training the models, feature engineering is done separately. Such an approach is the only option if datasets are widely different. For example, dataset consisting of "transcripts from a customer care system" to be used for training a ML based chat bot versus a dataset consisting of "customer transactions" to be used for training a ML based personalization engine. In such a case the relevant features tend to be very different across these two datasets and hence separate feature engineering effort is required and justified. However, in cases where datasets are similar, for example, "customer transactions" datasets from two domains (e.g., say e-retailers), existing conventional methods may not have capabilities to save a nontrivial part of effort in terms of feature engineering.

SUMMARY

Embodiments of the present disclosure present technological improvements as solutions to one or more of the above-mentioned technical problems recognized by the inventors in conventional systems. For example, in one aspect, there is provided a processor implemented method for data meta-model-based feature vector set generation for training machine learning models. The method comprises obtaining a plurality of datasets from a plurality of sources, wherein the plurality of datasets corresponding to one or more domains; generating a meta file based on a mapping of the plurality of datasets obtained from the plurality of sources to a data meta model that is identified based on the one or more domains, wherein the meta file comprises meta data and information pertaining to one or more specific actions being performed; generating one or more functions using the generated meta file and assigning the generated one or more functions to one or more corresponding data characterized in the generated meta file; invoking the generated one or more functions to generate a feature vector set specific to the one or more corresponding data comprised in the plurality of datasets; and training one or more machine learning models using the features vector set.

In an embodiment, each of the generated one or more functions when invoked is applied on the data characterized in the generated meta file.

In an embodiment, the method further comprises creating a library with the generated one or more functions, and periodically updating the created library based on one or more subsequent datasets being received.

In an embodiment, the method further comprises creating a library of the data meta model and subsequent data meta models being generated based on one or more subsequent datasets being received specific to the one or more domains.

In another aspect, there is provided a system for data meta-model-based feature vector set generation for training machine learning models. The system comprises: a memory storing instructions; one or more communication interfaces; and one or more hardware processors coupled to the memory via the one or more communication interfaces, wherein the one or more hardware processors are configured by the instructions to: obtain a plurality of datasets from a plurality of sources, wherein the plurality of datasets corresponding to one or more domains; generate a meta file based on a mapping of the plurality of datasets obtained from the plurality of sources to a data meta model that is identified based on the one or more domains, wherein the meta file comprises meta data and information pertaining to one or more specific actions being performed; generate one or more functions using the generated meta file and assign the generated one or more functions to one or more corresponding data characterized in the generated meta file; invoke the generated one or more functions to generate a feature vector set specific to the one or more corresponding data comprised in the plurality of datasets; and train one or more machine learning models using the features vector set.

In an embodiment, each of the generated one or more functions when invoked is applied on the data characterized in the generated meta file.

In an embodiment, the one or more hardware processors are further by the instructions to create a library with the generated one or more functions, and periodically updating the created library based on one or more subsequent datasets being received.

In an embodiment, the one or more hardware processors are further by the instructions to create a library of the data meta model and subsequent data meta models being generated based on one or more subsequent datasets being received specific to the one or more domains.

In yet another aspect, there are provided one or more non-transitory machine-readable information storage mediums comprising one or more instructions which when executed by one or more hardware processors cause data meta-model-based feature vector set generation for training machine learning models by obtaining a plurality of datasets from a plurality of sources, wherein the plurality of datasets corresponding to one or more domains; generating a meta file based on a mapping of the plurality of datasets obtained from the plurality of sources to a data meta model that is identified based on the one or more domains, wherein the meta file comprises meta data and information pertaining to one or more specific actions being performed; generating one or more functions using the generated meta file and assigning the generated one or more functions to one or more corresponding data characterized in the generated meta file; invoking the generated one or more functions to generate a feature vector set specific to the one or more corresponding data comprised in the plurality of datasets; and training one or more machine learning models using the features vector set.

In an embodiment, each of the generated one or more functions when invoked is applied on the data characterized in the meta file.

In an embodiment, the instructions which when executed by the one or more hardware processors further cause creating a library with the generated one or more functions, and periodically updating the created library based on one or more subsequent datasets being received.

In an embodiment, the instructions which when executed by the one or more hardware processors further cause creating a library of the data meta model and subsequent data meta models being generated based on one or more subsequent datasets being received specific to the one or more domains.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 2 depicts an exemplary flow chart for data meta-model based feature vector set generation for training machine learning models using the system of FIG. 1, in accordance with an embodiment of the present disclosure.

DETAILED DESCRIPTION

Figure 1:
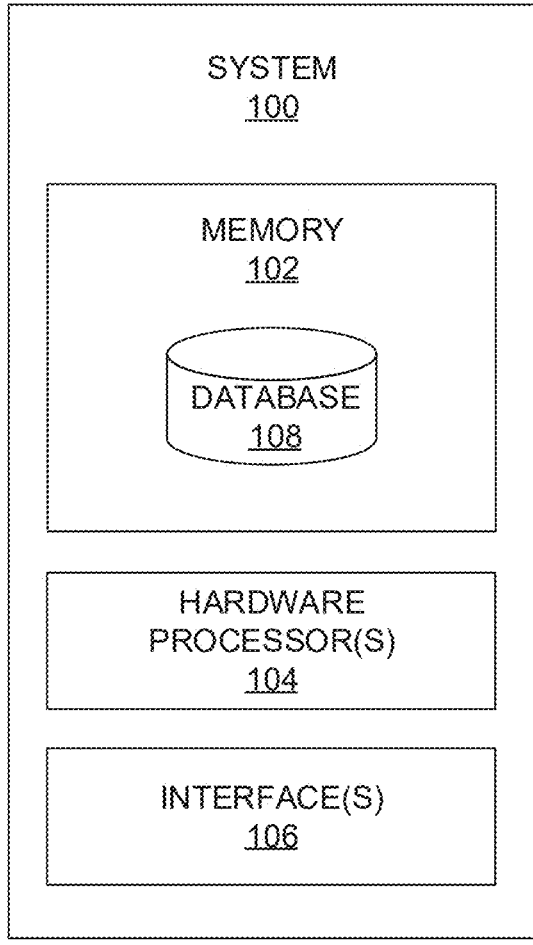
FIG. 1 depicts an exemplary block diagram of a system for data meta-model based feature vector set generation for training machine learning models, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

As mentioned earlier, feature engineering is a critical part of any Machine Learning/Deep Learning based solution(s). The accuracy of predictions made by the trained ML/DL models directly depends on the quality of features utilized to train them. Currently, the feature engineering is done on a per data-set basis, i.e., for every given dataset to be used for training the models, feature engineering is done separately.

Even if a machine learning (ML) expert or a data scientist wants to exploit commonalities across datasets there are no set guidelines or approaches to do so. Current solutions do not employ any standardized approach to derive features out of a given dataset. Due to this reason the existing ML schemes and methods which utilize datasets of non-trivial size suffer from various avoidable problems, challenges, and drawback(s). For instance, some of the problems, challenges, and drawback(s) include, but are not limited to: (i) inflexible feature engineering code which depends on the structure and content of the dataset (tightly coupled with the dataset), (ii) such a code cannot be utilized for any other, even similar, datasets; (iii) significant over head of re-testing of code whenever any feature is changed or introduced, as feature engineering process is iterative in nature the development and testing effort is significant for a tightly coupled code. Further other challenges include lack of standardization, for instance, in the conventional art and literature, it is observed that there is an absence of (i) standardized way to reuse learnings/domain knowledge gained across similar datasets, (ii) non-automated approaches for feature engineering and every use case and dataset are handled separately, and (iii) capturing of commonality across datasets. Thus, re-use effort in terms of development and testing cannot be reused.

Machine learning/Deep learning method-based solutions have become pervasive in their use across businesses which utilize these solutions to solve problems. Examples of such problems are recommendations to various entities (e.g., end users) customers, automation of customer support, modelling of (business) processes, forecasting, and the like. Standardization significantly improves the "reuse" of effort across solutions and solve the problems mentioned above.

Further, dataset as mentioned here is assumed to solely contain relevant data which has been derived from the larger data available with the entities. The relevance of the data depends on an end objective (or "goal") to be served by ML/DL based solutions. For example, a hotel wants to deploy a "personalization solution" with the goal that it recommends to a guest those food and beverage items among the available items which are highly and likely to be bought/consumed by that guest. For such a goal the piece of data which contains number and types of rooms present the hotel may be irrelevant. However, such data may be present in the overall database available with the hotel. It is the responsibility of ML/DL experts and data scientist who design such personalization solution (or any other ML/DL solution) to consciously select only that piece of data which is deemed relevant for the end goal. This relevant data selection step precedes the feature engineering step discussed previously.

Further, mapping the goal to the relevant data (out of overall data present) is a skill intensive process. It is crucial because without relevant data the feature engineering effort, howsoever good it is, may not be able to produce good features to train the models. It is pertinent to note that relevant data identification is critical and utmost of importance in feature engineering. A data scientist is expected to analyze and identify the relevant data.

As can be realized that businesses today are increasingly trying to exploit the customer-business interaction data available with them to understand how they can make their offerings more suited for the customers. For example, an e-retailer over website wants to showcase those products on first web page which have higher chances to be bought by the customer. In other words, businesses are trying to "personalize" their offering to sell more. The best way to "personalize" is to analyze historical interactions to capture likes and dislikes of customers and then tune the future offerings accordingly. For this, historical interactions at per customer level are to be analyzed. Due to large number of customers, their interactions with businesses/entities and/or large number of offering, the size of such historical interaction data is huge (several hundreds of megabytes to terabytes (MBs to TBs). Businesses entities are increasingly utilizing MLDL tools over the historical interaction data for analysis and further to personalize the future interactions with customers. By using machine learning and deep learning over the historical interaction data, the entities try to "model" the customer behavior. They utilize ML/DL based "model building" algorithms to build "models" which can then be utilized to predict outcome when, say, a customer C1 is shown a product P1. The key is that models can be used to predict outcome for not just 1 product but hundreds or even thousands of products (P1, P2, . . . , Pn). The trained models return the scores (generally between 0 to 1) where a higher score for a product means the customer is more likely to buy or like this product. Thus, the top k products depending on their scores returned by the trained model can be shown to customers. Similar approach can be used to find which "advertisement" to be shown to a customer or what time is most suited to connect to a customer. However, designing and implementing such personalization solutions using Machine Learning/Deep Learning techniques pose several challenges. Some of the challenges are to name a few from which the present disclosure takes motivation to address the technical problems and provide technical solution(s): (i) feature engineering from scratch, (ii) relevant data identification, (iii) skill set requirement, (iv) capturing and reusing domain knowledge and learnings, (v) time intensiveness, (vi) lack of automation to generate features and the like. Considering feature engineering from scratch-Even before Machines learning or Deep Learning model training algorithms are used over a business to consumer/ customer (B2C) interaction dataset the data needs to be converted to "features". Models trained on well-engineered features tend to have better prediction accuracy than models trained on raw data. The feature engineering code needs to process data and create feature. Thus, the feature engineering code gets tightly coupled with the data which hampers the "reusability" of such code. Feature engineering is also an iterative process. Data scientists may have to re-check relevance of data and include/exclude some more data elements if the prediction accuracy of models is found to be insufficient. Due to code being tightly coupled with data, it becomes necessary to re-develop the code and retest it.

Further, regarding, relevant data identification—it is to be understood that not all data available with the business or entities might be useful for modelling the customer behavior. However, identifying the relevant data out of the larger dataset towards a personalization goal is a challenge even for expert data scientists. Lack of a structure or guidelines result in wastage effort. Skill requirement-Machine learning and deep learning are skill intensive profile. There is a mismatch in demand for such experts due to explosion in number of ML/DL based solutions being demanded by business/entities (organizations) and supply of skilled experts. Capturing and reusing domain Knowledge and learnings-Datasets belonging to same domain, say e-retail, even from different businesses/entities tend to have similarities. What this means is that, if a ML/DL based solution is developed for two similar businesses having similar dataset, a lot of effort domain knowledge and learning derived from one dataset can be reused for other. Time intensiveness-Data driven solutions involving ML/DL consume a lot of time. Major share (approx. 65%-75%) of time goes in feature engineering (including tuning). Reuse of effort has potential to save time. Standardization across the whole solution designing process is necessary to exploit chances of reuse. Lack of automation to generate features-datasets for instance, B2C datasets, can be widely different from each other even when they are from same (business) domains. Due to this the automation in feature generation is challenging. However, the question remains: Is such a layer of abstraction (data meta-model) over datasets even possible? B2C datasets from different business domains are very different in their content. For example, how a e-retailer's dataset and a bank's dataset can be described by same layer of abstraction? The answer to these questions is Yes, such an abstraction layer is possible, because, B2C dataset typically consists of information regarding customer-business interactions. B2C dataset is described in below description of FIGS. of the present disclosure, following which the layer of abstraction or data meta-model is explained.

Therefore, embodiments of the present disclosure implement systems and methods for feature engineering and thereby using these features set for training ML/DL models for such personalization. Particularly, embodiments of the present disclosure provide systems and methods for data meta-model-based feature vector set generation for training machine learning models. More specifically, the present disclosure addresses the above technical problems by bringing in standardization in "feature engineering" effort which involves both planning and coding effort. Feature engineering is traditionally being considered as "art" and heavily depends on the skill level of the person performing it (ML/DL expert or Data Scientist). Given the same goal and relevant dataset, it is highly unlikely that two ML/DL experts or data scientists come up with same set of features. Thus, standardization reduces dependence on skill set of ML/DL expert performing feature engineering. Rather, the effort put by the most skilled feature engineer can be reused. Present disclosure further solves the problem of reuse of feature engineering by providing systems and methods for reuse of feature engineering code possible across different datasets (e.g., business to consumer (B2C) datasets). Thus, rather than developing code from scratch for every ML/DL based personalization solution, previously developed and tested standardized code can be reused. This further addresses the problem of automation. Standardization in "feature engineering" effort opens opportunities for automation. Another problem that is being addressed by the present disclosure is the ability to accelerate the solution implementation time. By reuse of code/learning the method of the present disclosure saves effort involved development, testing time for a "ML/DL based personalization solution". Thus, improving productivity of ML/DL experts who can now work on a greater number of solutions than before. The present disclosure further makes reuse of "relevant knowledge" and "insights gained" possible across different datasets, thus bringing structure to "feature engineering" effort.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 depicts an exemplary block diagram of a system 100 for data meta-model based feature vector set generation for training machine learning models, in accordance with an embodiment of the present disclosure. The system 100 may also be referred as 'feature engineering system' and may be interchangeably used hereinafter. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information, for example, plurality of datasets from a plurality of sources wherein each dataset may correspond to one or more domains (e.g., retail, financial, etc.), data meta model(s), generated meta file(s) for each dataset, mapping information of dataset to data meta models, meta data, functions, assignment of functions to corresponding data in the meta file, feature vector set for the dataset(s), machine learning (ML)/deep learning (DL) model(s), and the like. The database 108 further stores information on training carried out for each ML/DL.

In an embodiment, the memory 102 may store (or stores) one of more techniques/ML and/or DL models. For instance, deep learning models(s) may be comprised in the memory 102 and executed accordingly to prediction and the like. The memory 102 further comprises severity information pertaining to each classified defect region. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

FIG. 2, with reference to FIG. 1, depicts an exemplary flow chart for data meta-model based feature vector set generation for training machine learning models using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the flow diagram as depicted in FIG. 2 and FIGS. 3A through 5. At step 202 of the present disclosure, the one or more hardware processors 104 obtain a plurality of datasets from a plurality of sources. In an embodiment of the present disclosure, the plurality of datasets corresponds to one or more domains. Expression 'datasets' herein refer to data available in B2C domain. More specifically, it is customer-business interaction data which is available with most of the entities/businesses such as e-retail, hospitality, financial advisory, and the like. These businesses/entities log all their interactions with customers in data-stores (databases or data-lakes, etc.). These interactions can be over multiple channels such as online, emails, over the counter, through call center over phones, chat-bots, etc.

Prior to receiving the plurality of datasets, it is important/pertinent to identify relevant data (refer below Table 1), wherein the dataset contains the "interaction log" which contains product "views", "orders" and also product advertisement clicks ("impressions")—refer "transaction type" column. "uid" refers to customer id, "category1", "category2" refers to the categorization of the product. For example, milk can have "perishable" as category 1 (or category1) and "dairy" as category 2 (or category2). In real world, such categories are identified by codes as shown in Table 1. "Item_id" denotes a product id.

TABLE 1

| app_code | brand | cate-gory1 | cate-gory2 | device | is_click | is_con-version | item_id | price | quantity | server_time | session_id | trans-action_id | trans-action_typ | uid |
|---|---|---|---|---|---|---|---|---|---|---|---|---|---|---|
| NA | 0173c0d | de19bda | ace4b8b | PC | NA | NA | 4e2406d | 64260 | NA | Aug. 8, 2016 | GlzoSWAJ8 | NA | view | 70 |
| NA | 0173c0d | de19bda | ace4b8b | Laptop | NA | NA | 4e2406d | 64260 | NA | Aug. 23, 2016 | sQxrejqeWJ | NA | view | 70 |
| NA | 0e886c7 | de19bda | ace4b8b | Laptop | NA | NA | 751a098 | 53820 | 1 | Aug. 28, 2016 | 8A3i7E8Z6y | 00af241 | order | 70 |
| 23715 | NA | NA | NA | Mobile | 0 | 0 | NA | NA | NA | Sep. 12, 2016 | NA | 89978 | impressio | 70 |
| NA | adf17cd | d9d0ba9 | bd0b0a5 | PC | NA | NA | 036acf8 | 94400 | NA | Sep. 21, 2016 | t8FMpfgCfY | NA | view | 70 |
| NA | adf17cd | d9d0ba9 | bd0b0a5 | iPad | NA | NA | 804ca00 | 94400 | 1 | Sep. 21, 2016 | t8FMpfgCfY | bdd1f5c | order | 70 |
| NA | 64ebcb5 | c12d0e1 | e9c2fc2 | Mobile | NA | NA | 18105ac | 34110 | NA | Sep. 28, 2016 | 6YnfZcLAvB | NA | view | 70 |

In the present disclosure, a dataset is a B2C data set which consists of events where a customer interacts with business/entities (B2C interactions). Such business to customer interactions can take various forms as mentioned below by way of non-construing examples:

a. Identifying and procuring physical goods sold by entities/businesses, e.g., as in e-retail.

b. Accessing and using some service(s) provided by the entities/business, e.g., financial advices.

c. Simply browsing of one or more offerings (e.g., services or products) by business/specific entities.

d. Seeking information or clarifications or complaining about a service or product.

Such interactions are recorded by entities/businesses. For example, a B2C dataset could include recorded interactions which may look like:

1. Interaction in Clothing Retail: Say, Sita adds an orange striped T-shirt to her shopping cart on an online-shopping store at time "t". Her shopping cart already has a blue jeans and black shoes.

2. Interaction in Furniture Retail: Customer Shyam buys a teak coffee table from an online furniture mart after browsing 25 coffee tables in the section at time "t" using his Laptop.

3. Interaction in Financial Domain 1: Anirudhha invests in solar energy mutual fund offered by a green energy investment firm given that he is an environment conservation activist. He used a "paper-form" and attached a Cheque (also referred as 'check' and may be interchangeably used hereinafter) for investing.

4. In reality as mentioned earlier, the above-mentioned example, interaction (e.g., clothing Retail one) is stored in a structured format in a table (Table 2) containing various columns as shown below:

'data meta-model' as used in the present disclosure refers to a "data model" which can be seen as a layer of abstraction over the B2C dataset. The abstraction layer "meta-model" describes important components or entities in a dataset. Every entity or component of a dataset can be expressed using the meta-model.

Figure 3A:
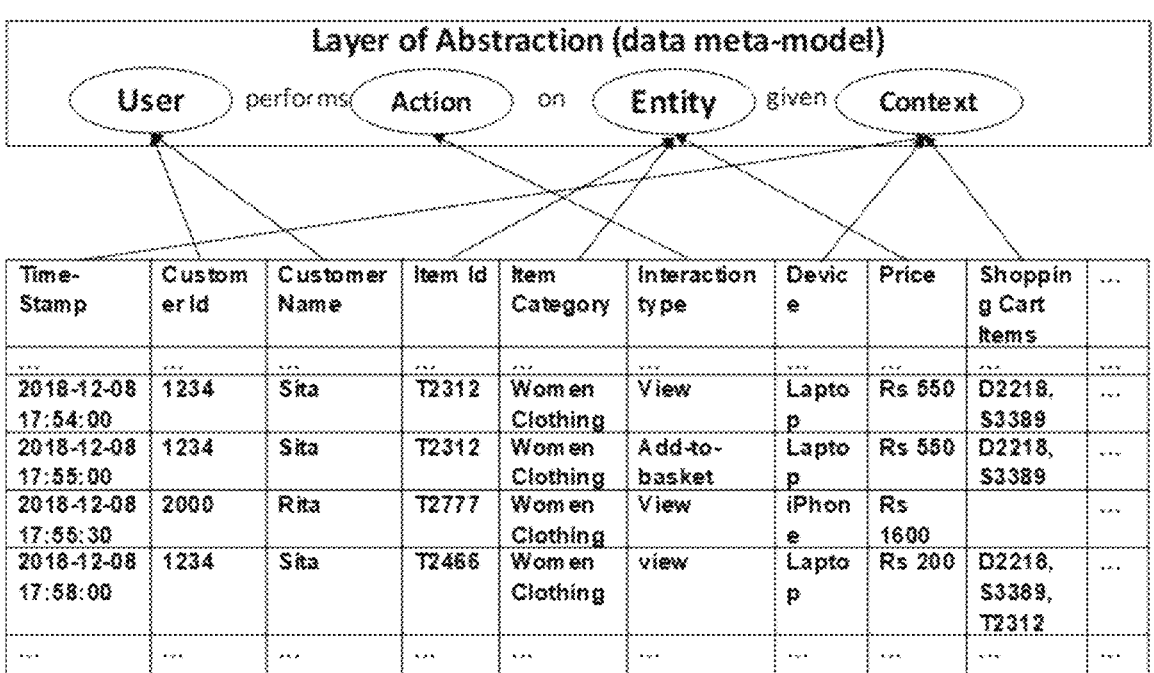
FIG. 3A depicts a data meta-model for a dataset pertaining to a clothing retail domain, in accordance with an embodiment of the present disclosure.
Figure 3B:
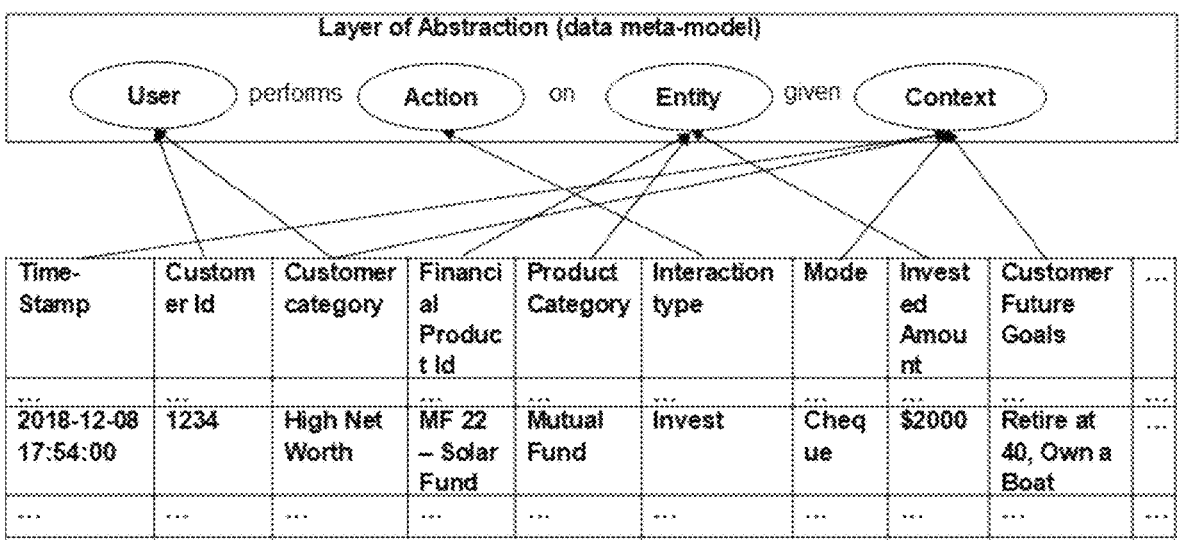
FIG. 3B depicts a data meta-model for a financial business to consumer (B2C) dataset pertaining to a financial domain, in accordance with an embodiment of the present disclosure.
Figure 3C:
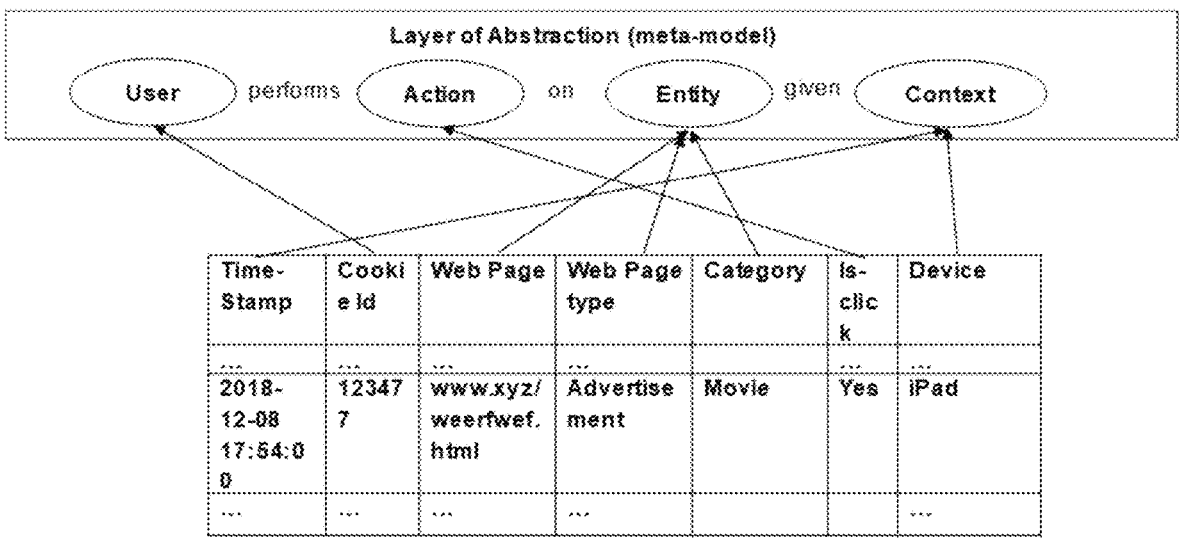
FIG. 3C depicts a data meta-model for an advertisement click (B2C) dataset pertaining to a specific domain, in accordance with an embodiment of the present disclosure.

The data meta models are depicted in FIGS. 3A through 3C for various datasets and domains, in accordance with an embodiment of the present disclosure. More specifically, FIG. 3A, with reference to FIG. 1 through 2, depicts a data meta-model for a dataset pertaining to a clothing retail domain, in accordance with an embodiment of the present disclosure. In FIG. 3A, layer of abstraction (meta-model) is shown wherein the layer essentially contains 4 actors "User", "Action", "Entity" and "Context". The intent in the present disclosure is that using these 4 actors the systems and methods associated thereof describe the interactions data. In other words, every row of the B2C dataset essentially gives information, for instance, "user performing some action on some entity given a certain Context". This statement is true for any B2C dataset capturing customer-business/entity interaction. Meta data (meta-data) refers to date type, categorical type, data from data column to which actor it maps, and the like.

FIG. 3B, with reference to FIG. 1 through 3A, depicts a data meta-model for a financial business to consumer (B2C) dataset pertaining to a financial domain, in accordance with an embodiment of the present disclosure. FIG. 3C, with reference to FIG. 1 through 3B, depicts a data meta-model for an advertisement click (B2C) dataset pertaining to a specific domain, in accordance with an embodiment of the present disclosure. In the data meta-model for the advertisement click dataset as depicted in FIG. 3C, user(s) is/are identified using cookie(s). After a close observation at FIGS.

TABLE 2

| Time Stamp | Customer Id | Customer Name | Item Id | Item Category | Interaction type | Device | Price | Shopping Cart Items | ... |
|---|---|---|---|---|---|---|---|---|---|
| 2018-12-08 17:55:00 | 1234 | Sita | T2312 | Women Clothing | Add-to-basket | Laptop | Rs 550 | D2218, S3389 | ... |
| ... | ... | ... | ... | ... | ... | | ... | ... | |

Such interaction data may get stored in one table or may get stored in different tables. For example, interaction involving "buying/selling" may get stored in a "Transaction" table, whereas, browsing activity (or click stream) may be stored in another table (at other place also). However, data is collected from different sources, it is then merged and joined to get a single table where different kinds of interactions are stored.

Figure 3D:
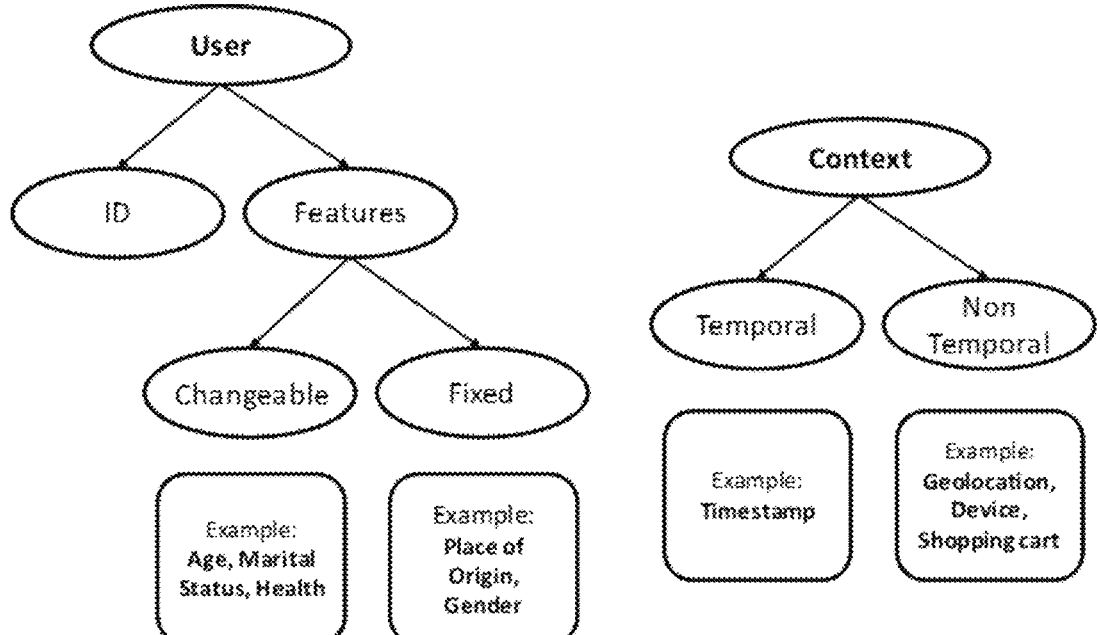
FIGS. 3D through 3F, depict an extended and a detailed data meta-model which captures specifics of a retail domain, in accordance with an embodiment of the present disclosure.
Figure 3E:
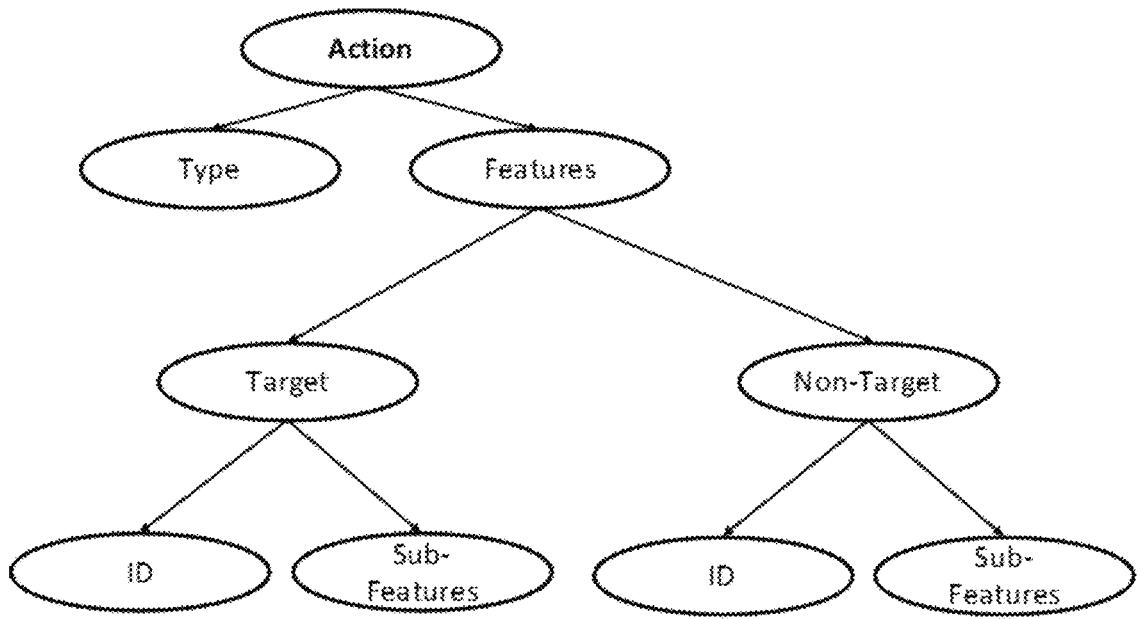
Figure 3F:
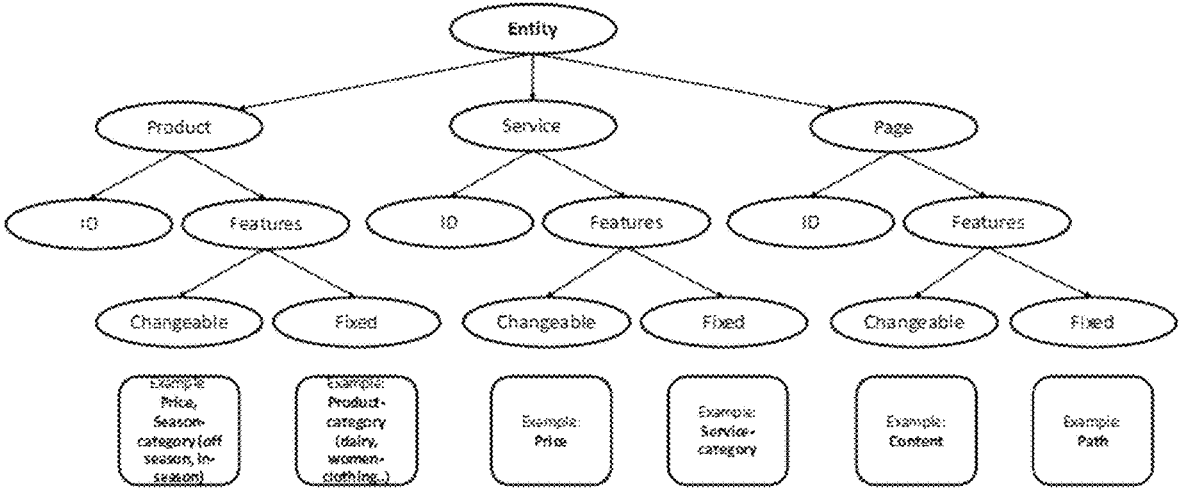

Referring to further steps of FIG. 2, at step 204 of the present disclosure, the one or more hardware processors 104 generate a meta file based on a mapping of the plurality of datasets obtained from the plurality of sources to a data meta model that is identified based on the one or more domains. In an embodiment, the meta file comprises meta data and information pertaining to one or more specific actions being performed (or to be performed). Information pertaining to actions refer to actions performed by functions (e.g., sum can be action, window can be action wherein it aggregates count of data values for a specified, and the like). Alternatively, information pertaining to the one or more specific actions to be performed form part of the generated meta file, in one embodiment of the present disclosure. Expression 3A through 3C, the question that remains is: Q5: Is the level of abstraction with only 4 actors enough? The 4 actors are the most generalized ones. Every B2C dataset has them and thus is a good level to understand the concept. However, to capture the nature and essence of data columns a more granular layer of abstraction is needed. In other words, more actors are required. Another question that remains is: How does this data meta-model handles the specifics of a (business) domain? The data meta-model explained above is (easily) extendible to suit the specifics of a particular (business) domain. The present disclosure overcomes this technical problem by described a "domain specific" meta model for retail, wherein specifics of a (business) domain is handled by introducing "sub actors". Further question that arises is: "how many actors are required?". If data meta-model is generated with more and more granular (specific) details/data, a point will be reached where there will be an actor for every data column. At that point the layer of abstraction will not "abstract" anything. Moreover, such a granular abstraction will be different for every dataset. However, the task at hand is to identify a level of abstraction which lets the system 100 capture the nature and essence of data column elements and yet remains common and useful across datasets. In FIGS. 3D through 3F, one such level of abstraction for "retail" business domain is depicted. More specifically, FIGS. 3D through 3F, with reference to FIGS. 1 through 3C, depicts an extended and a detailed data meta-model which captures specifics of a retail domain, in accordance with an embodiment of the present disclosure. As depicted in FIGS. 3D through 3F, four actors User, Action, Context and Entity are extended and sub actors capturing the specificities of retail datasets are added. Actors and sub actors are explained below for better understanding of the embodiments and the present disclosure:

1. User: User in retail is the customer. Customer actor includes following sub-actors such as:
 a. Id: This is a unique id associated with each user. The dataset identifies a user with his/her id.
 b. Features-Changeable: This sub actor represents the changeable attributes of a customer. Some examples of changeable customer attributes are: Age (changes every year), Marital Status, Health status, Address, Membership status.
 c. Features-Fixed: This sub actor represents fixed customer attributes. Examples include: Date of Birth, Country of origin, Sex, Eye colour, and the like.

Sometimes it does happen that a data element might seem to fit both the changeable and non-changeable. For example, hair colour is one such attribute. Depending on the significance of hair colour on the personalization goal it can be categorized in either. For clothing-fashion retail personalization, the hair colour is significant and many people colour their hair. Thus, categorizing "hair colour" as "Changeable Feature" may give rise to better features. However, if the personalization goal is "selecting hair dye" then the "hair colour" is unchangeable (fixed) and set as the natural hair colour.

2. Entity: In retail domain, depending on the business, and entity can take various forms. It can be a product, a service, an interface (e.g., website, call center, an interactive voice response (IVR) and the like). For example, in an e-retail setting, the entity can be the "product description page", it can also be the "product" which customer wants to buy or return. The retail can also be of a service. For example, booking a taxi. In this case the entity is "taxi-service". All such products, services, webpages have a unique id in the dataset. Along with id there are:
 a. Features-changeable: Price of the product/service, content of webpage, location of the webpage, availability of the product, etc.
 b. Features-Fixed: category of product (for food the category can be dairy, cereals, etc.), service category, etc.

3. Action(s): Customer can perform various actions depending on the entity and (business) domain. Actions can be buying the product, selling the product, returning the product, browsing the product page, adding product to basket/cart, making payment, booking a service, availing a service, clicking on webpage, and the like.

Unlike customer (user) and Entity, an action is not identifiable on its own. Actions captures interaction event between the user and entity hence it derives its identity using these two actors. Transaction logs of product purchases is one such set of actions. Action has a "type" sub-actor. Buy/sell/click, etc. are different types of actions. Action can be a "target action" or a "non-target" action. The "target action" is what the present disclosure attempts to predict using machine learning/deep learning techniques. For example, consider a scenario for personalizing the product offering for a customer. Here for a customer C, a product P needs to be recommended/suggested out of set of K products (P1, . . . , Pk).

Assuming there is a trained model M which predicts the buying behavior of customers. The personalization goal in this case is "using M predict the action "buy" for every product (from P1, . . . , Pk). Model returns with the probability scores of "buy" between 0 to 1 for every product. Thus, product P to be recommended can be selected as the one among (P1, . . . , Pk) which has highest "buy" score. It can be seen that "buy" is target action. Other actions such as "adding to cart", "removing from cart", "clicking on product description page", etc. are all "non-target".

In some other cases where, for example, personalization goal is "display personalized pictures", the target action is "click" on the picture (assuming upon clicking the picture enlarges).

4. Context: A lot of attributes get categorized in "context" actor. Context can be of two types:
 a. Temporal: The "time stamp" at which the action happened between customer and entity. Other temporal contexts can be "weather". For example, sale of umbrellas may shoot up during rains.
 b. Non-Temporal Contexts: Examples, include "device" used for accessing the product or service (customer using a mobile phone to access website versus Table versus Laptop).

Below is an exemplary table (Table 3) that depicts a generated meta file based on a mapping of the dataset obtained from the plurality of sources to a data meta model that is identified based on the one or more domains as depicted in FIGS. 3A through 3C.

TABLE 3

| Data Column | Type | Actor | Subactor | Function |
|---|---|---|---|---|
| app_code | categorical | Context | Context_nontemporal | dictionary |
| brand | categorical | Product | Product_nonchangeable | |
| category1 | categorical | Product | Product_nonchangeable | dictionary |
| category2 | categorical | Product | Product_nonchangeable | dictionary |
| device | categorical | Context | Context_nontemporal | dictionary |
| is_click | boolean | Action | Action_nontarget | windows, NeverOccured |
| is_conversion | boolean | Action | Action_target | windows, NeverOccured |
| item_id | categorical | Product | Product_category | |
| price | continous | Product | Product_changeable | |
| quantity | continous | Customer, Product | | |
| server_time | date | Context | context_temporal | occurrence_in_week |
| session_id | categorical | Context | context_temporal | |
| transaction_id | categorical | Action | Action_id | |
| transaction_type | categorical | Action | Action_type | windows |
| uid | categorical | Customer | Customer_id | |

Below description depicts mapping performed by the system 100 of the present disclosure by way of example:
1. Data Column to Actor Mapping: Consider "Device" data column from Table 1. This column stores information about the device used for interaction. Note how this "Device" is mapped to "Context" actor and further to "context non-temporal" as sub-actor. Other mappings can also be followed in similar manner. For majority of data columns, the mapping is straight forward. However, there can be some data columns for which more than one actor might seem to be suited. Consider Data Column "Quantity" in Table 1. Shall it be categorized under "user" actor or "product" actor. For example, an individual may buy 1 kilograms (kg) of potatoes at a time, whereas, same individual (who also owns a small eatery) might buy 25 kg at some other time. Now, the question is whether "quantity" is an attribute of customer or product. Depending on the personalization one or the other option can be chosen. Data meta-model also allows selecting both "user" and "Entity" at same time also. This is because attributes such as "quantity" may better describe users' relation with an entity.

2. Defining Type of data in data column: Data can be "continuous" or "dynamic", such as price, which can take any value. Data can also be "categorical", such as device, which can take value out of a specific set only. Data can also be of "date" type such as timestamps (refer server_time column in Table 1). A special category of "categorical" data type is "Boolean" where data can have only 2 possible values.

Referring to steps of FIG. 2, at step 206, the one or more hardware processors 104 generate one or more functions using the generated meta file and assign the generated one or more functions to one or more corresponding data characterized (or described) in the generated meta file. The one or more corresponding data herein refers to data of respective data column in the above Table 3. Functions (or procedures) are generated to generate features: In Table 3, there is a column named "Functions". This "function" denotes the "code" or "procedure" to be used over the data column against which it is mentioned. The functions mentioned "dictionary", "windows", "never_occured", "occurrence_in_week" are all part library which is created and stored in the database for various datasets received for one or more domains. Depending on the Actor, Sub-actor and type of data there is a choice of functions which can be applied. The system 100 selects the functions automatically (using below Table 4). By default, all the functions which are applicable are selected (refer column "Function" in Table 3 where some rows have multiple functions applied). User, if required, can intervene the automated process and deselect one or more already selected functions. In other words, for any modifications on functions assignment, the system 100 may obtain one or more user inputs for assignment of these functions to Actor, Sub-actor and type of data respectively.

Note that not all functions are applicable to all actors/sub-actors. Table 3 shows only few of the functions and these functions shall not be construed as limiting the scope of the present disclosure. There can be whole library of such developed functions. In other words, a library of the generated one or more functions is created by the system 100, and the created library of generated functions may be (or is) periodically updated based on one or more subsequent datasets being received for feature engineering and training of ML/DL models. Below is an exemplary table (Table 4) depicting assignment of a function to corresponding data comprised in the generated meta file.

TABLE 4

| Actor | Subactor_L1 | Subactor_L2 | Subactor_L3 | Data Type | Function |
|---|---|---|---|---|---|
| User | Feature | Changeable | | Categorical | dictionary |
| User | Feature | NonChangeable | | Categorical | dictionary |
| User | ID | | | Categorical | |
| User | Feature | Changeable | | Continuous | sum Of |
| User | Feature | NonChangeable | | Continuous | sum Of |
| User | Feature | Changeable | | Boolean | NeverOccured |
| User | Feature | NonChangeable | | Boolean | NeverOccured |
| User | Feature | NonChangeable | | Date | dictionary |
| User | Feature | Changeable | | Date | dictionary |
| Action | ID | | | Categorical | windows |
| Action | Feature | NonTarget | ID | Categorical | |
| Action | Feature | NonTarget | SubFeature | Categorical | dictionary |
| Action | Feature | NonTarget | SubFeature | Continuous | sum Of |
| Action | Feature | NonTarget | SubFeature | Boolean | windows/ NeverOccured |
| Action | Feature | NonTarget | SubFeature | Date | dictionary |
| Action | Feature | Target | ID | Categorical | |
| Action | Feature | Target | SubFeature | Categorical | dictionary |
| Action | Feature | Target | SubFeature | Continuous | sum Of |
| Action | Feature | Target | SubFeatureTemporal | Categorical | Dictionary/ sum Of |
| Action | Feature | Target | SubFeature | Boolean | windows/ NeverOccured |
| Action | Feature | Target | SubFeature | Date | dictionary |
| Entity | Product | ID | | Categorical | windows/length |
| Entity | Product | Feature | NonChangeable | Continuous | sum Of |
| Entity | Product | Feature | NonChangeable | Categorical | dictionary |
| Entity | Product | Feature | Changeable | Continuous | sum Of |
| Entity | Product | Feature | Changeable | Categorical | dictionary |
| Entity | Product | Feature | NonChangeable | Boolean | NeverOccured |
| Entity | Product | Feature | Changeable | Boolean | NeverOccured |

TABLE 4-continued

| Actor | Subactor_L1 | Subactor_L2 | Subactor_L3 | Data Type | Function |
|---|---|---|---|---|---|
| Entity | Product | Feature | NonChangeable | Date | dictionary |
| Entity | Product | Feature | Changeable | Date | dictionary |
| Context | Temporal | | | Date | sum_reoccurrence_duration/ occurrence_in_week |
| Context | Non-Temporal | | | Categorical | dictionary |

Figure 4:
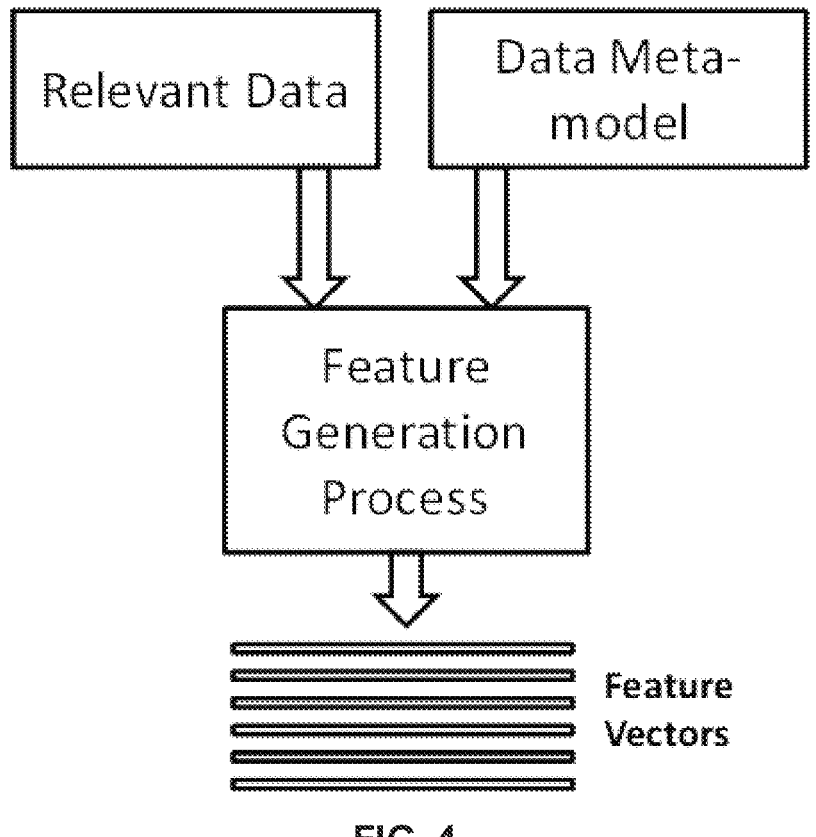
FIG. 4 depicts a flow diagram illustrating a method for generating a feature vector set specific to the one or more corresponding data comprised in the plurality of datasets, in accordance with an embodiment of the present disclosure.

Upon assignment of functions as described above, at step 208, the one or more hardware processors 104 invoke the generated one or more functions to generate a feature vector set specific to the one or more corresponding data comprised in the plurality of datasets. In one embodiment, the one or more hardware processors 104 invoke the generated one or more functions to generate a feature vector set specific to the one or more corresponding data characterized in the plurality of datasets. Once the data meta file" (depicted in Table 4 above) for a dataset (depicted in Table 1) is generated (or ready) feature vectors can be generated by invoking the generated one or more functions. In other words, in an embodiment, each of the generated one or more functions when invoked is applied on the data characterized (or data described) in the generated meta file. This is automated as a script (piece of code) that invokes appropriate functions mentioned in "data meta file" for every data element in a data row (iteratively) over every row (one row at a time). FIG. 4, with reference to FIGS. 1 through 3C, depicts a flow diagram illustrating a method for generating a feature vector set specific to the one or more corresponding data comprised in the plurality of datasets, in accordance with an embodiment of the present disclosure. It can be observed from FIG. 4 that the code for feature engineering/feature vector set generation is independent of the "Data" to be utilized.

For better understanding of step 208, present disclosure considers a simple example of a "feature generation". Function "sumOf" maintains a cumulative count of data present in the data column against which it is mentioned. Refer Table 4, the "sumOf" function is mentioned against the continuous data type. An example could be the "quantity" of item purchased. Every row in the dataset denotes a quantity of item, say liters of milk purchased by a customer. The function "sumOf" cumulates the quantity to generate features such as but not limited to, "amount of milk purchased by customer till now", and the like. Examples of other functions may include but are not limited to, say a "Window" Function: "Window" function creates aggregate count of data values for a specified (given as configured) time window. The time window configured can be any time duration, for example, an hour, a day, a fortnight, a season, a festival duration, etc. Window function works on categorical data values. The output of this function is key value pairs where key is the data item and value is an aggregate occurrence count of that data item during the time window. Another example of function may include say, "Dictionary" Function: "Dictionary" function is similar to "Window" function, but it is applied over whole duration of data.

Referring to steps of FIG. 2, at step 210 of the present disclosure, the one or more hardware processors 104 train one or more machine learning models using the features vector set. The one or more machine learning models and/or deep learning models are comprised in the memory 102 and trained using the features vector set generated based on the datasets received.

Figure 5:
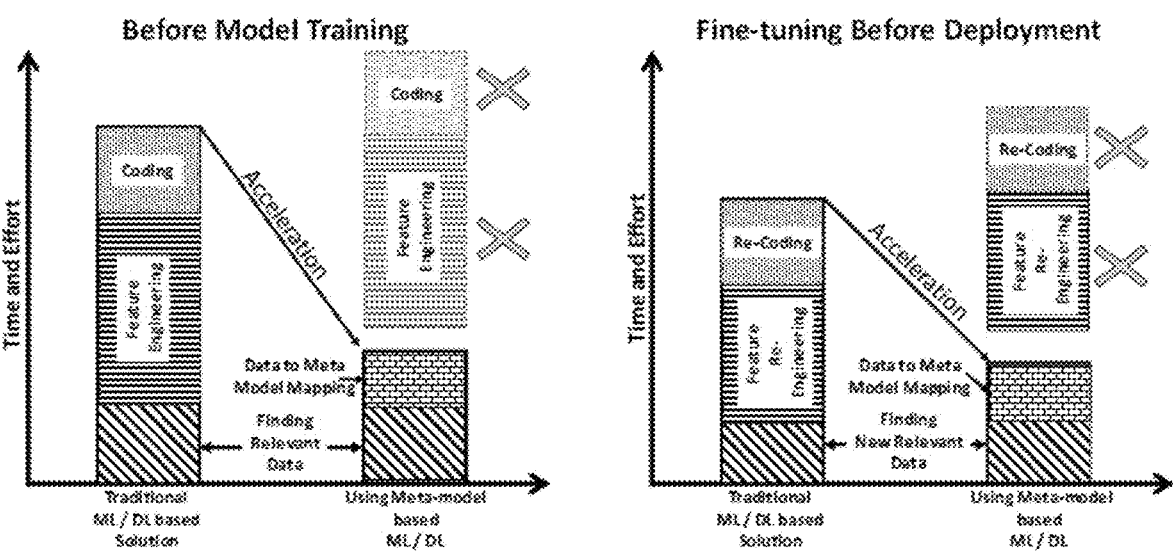
FIG. 5 depicts an effort comparison between Traditional machine learning/deep learning (ML/DL) approach versus data meta-model based ML/DL approach as implemented by the system of FIG. 1, in accordance with an embodiment of the present disclosure.

FIG. 5, with reference to FIGS. 1 through 4, depicts an effort comparison between Traditional machine learning/deep learning (ML/DL) approach versus data meta-model based ML/DL approach as implemented by the system 100 of FIG. 1, in accordance with an embodiment of the present disclosure. More specifically, FIG. 5 depicts acceleration achieved in implementing a ML/DL based solution when a meta-model based approach is employed versus a traditional approach being employed.

Embodiments of the present disclosure provide systems and methods for data meta-model-based feature vector set generation for training machine learning models. The present disclosure overcomes the above challenges posed. For instance, in general, a skilled data scientist or ML expert works on a dataset of a domain. For example, data scientist hired by an e-retailer. Such data scientist gets exposed to only one dataset. For same dataset, the layer of abstraction (or data meta-model) is not very useful and hence effort required to come-up with the abstraction as described is an overkill. Further systems and methods can be implemented by various entities (e.g., organizations, businesses, and the like), where entities get exposed to various clients/accounts/projects and hence wide variety of data. Typically, researchers/data scientists experiment and create models with data from a lot of B2C domains (retail, hospitality, travel, finance, telecom, government). With the layer of abstraction or data meta-model generated by the system 100, it is extremely useful in such scenario(s) wherein data in the dataset is not limited to, images, speech/video, logs, interactions. Such data is diverse and abstracting out commonalities. Further, given the diversity in data across domains, which is large, it is not natural for entities (or users) to imagine how commonalities can be abstracted out. With the help of method(s) described herein, present disclosure can generate data meta-models with commonalities.

As mentioned above, the present disclosure overcomes the below technical problems/challenges of the existing conventional approaches:

1. Feature Engineering from scratch: By employing data meta-model the feature engineering code is no longer tightly coupled with the data, thus, is reusable across datasets. Instead of writing new code the effort involved is correctly mapping the data columns from the datasets to the correct actors/sub-actors using the system 100.

2. Capturing and reusing Domain Knowledge and learnings: Abstracting a dataset provides stakeholders (e.g., data scientists, subject matter experts) with insights about the data. Such insights are important when working with other similar datasets. A dataset along with its meta-model is easier to understand in terms of its contents rather than the dataset alone.

3. Relevant data identification: The data meta-model is associated with the personalization goal in hand. If the personalization goal is same across solutions in similar B2C domains, then the data meta-model as generated by the system 100 can used as a guide to identify the relevant data from the newer dataset.

4. Skill requirement: Use of data meta-models requires correct mapping of relevant data to the meta-model. The feature engineering is already taken care of by the system and method of the present disclosure. Thus, instead of designing features which is a skill intensive task, mapping is all that is required which can be done based on dataset available (e.g., by understanding the dataset).

5. Time intensiveness: As mentioned above, in designing/implementing data driven solutions involving ML/DL, major share (approx. 65%-75%) of time goes in into feature Engineering (including tuning). When, data meta-model as generated by the system 100 of FIG. 1, is employed the required effort is reduced as feature engineering code can be reused.

Some of the advantages of re-use of the data meta-model generated by the system 100 (wherein the system can accept user inputs as and when required for any modification to the structure of the data meta-model that is being generated in the process) are as below:

1. Re-use of data meta-model allows re-use of domain knowledge, accumulated learning, experience, and the like. Abstracting a dataset provides with insights about the data. Such insights are important when working with other similar datasets. A dataset along with its meta-model is easier to understand in terms of its contents rather than the dataset alone as mentioned above.

A real-world B2C dataset, especially clickstream data, may contain 100s (hundreds) of columns. For example, try making sense of the dataset mentioned below without its meta-model.

the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

| app_code | brand | cate-gory1 | cate-gory2 | cate-gory3 | cate-gory4 | device | inventory_type | is_click | is_con-version | item_id | ... | transaction_typ | uid |
|---|---|---|---|---|---|---|---|---|---|---|---|---|---|
| NA | 0173c0 | de19bd | ace4b8 | 929e65 | 3a0ad9 | PC | NA | NA | NA | 4e2406 | ... | view | 70 |
| NA | 0173c0 | de19bd | ace4b8 | 929e65 | 3a0ad9 | Laptop | NA | NA | NA | 4e2406 | ... | view | 70 |
| NA | 0e886c | de19bd | ace4b8 | 929e65 | 3a0ad9 | Laptop | NA | NA | NA | 751a09 | ... | order | 70 |
| 23715 | NA | NA | NA | NA | NA | Mobile | B | 0 | 0 | NA | ... | impressi | 70 |
| NA | adf17cd | d9d0ba | bd0b0a | f1c99bd | 733473 | PC | NA | NA | NA | 036acf8 | ... | view | 70 |
| NA | adf17cd | d9d0ba | bd0b0a | f1c99bd | 733473 | iPad | NA | NA | NA | 804ca0 | ... | order | 70 |
| NA | 64ebcb | c12d0e | e9c2fc2 | 723413 | 473a11 | Mobile | NA | NA | NA | 18105a | ... | view | 70 |

As it is observed from above that feature engineering is also an iterative process. By using data meta-model, new data elements can be easily incorporated and removed whenever necessary. Just the mapping between data columns to data meta-model needs to be changed.

As mentioned above, further a layer of abstraction over data (or dataset) allows performing feature engineering and write code for it which is independent of the actual dataset. Thus, common code written can be used by the system 100 can be used across datasets. This is a significant effort reduction as for any ML or DL based solution, feature engineering involves 65%-75% of the total solution time.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:

obtaining, via one or more hardware processors, a plurality of datasets from a plurality of sources, wherein the plurality of datasets corresponding to one or more domains;

generating, via the one or more hardware processors, a meta file based on a mapping of the plurality of datasets obtained from the plurality of sources to actors and sub-actors in a data meta model that is identified based on the one or more domains and describing a domain-specific meta model and specifics of the domain is handled by introducing sub-actors in the domain-specific meta model, wherein the actors and the sub-actors capture specificities of the plurality of datasets and the sub-actors include features-changeable representing changeable attributes of a customer, and features-fixed representing fixed attributes of the customer, wherein the actors include user with a unique ID, action, entity and context of two types including temporal referring to a time stamp at which the action happened between the customer and the entity, and non-temporal includes a device to perform the action, wherein the meta file comprises meta data and information pertaining to one or more specific actions being performed, wherein the meta data refers to date type, categorical type, data from data column to which the actor and the sub-actor is mapped, Boolean, and continuous;

generating, via the one or more hardware processors, one or more functions using the generated meta file and assigning the generated one or more functions to one or more corresponding data characterized in the generated meta file, wherein the one or more functions denotes a code or a procedure used over the data column, wherein the one or more functions includes sumOf, Window, wherein the sumOf function maintains a cumulative count of data present in the data column, the Window function creates an aggregate count of data values for a specified time window of a time duration including an hour, a day, a fortnight, a season, a festival duration, the Window function works on categorical data values, and an output of the Window function is key value pairs, wherein the key is data item and the value is an aggregate occurrence count of said data item during the specified time window, and a Dictionary function is similar to the Window function, and applied over whole duration of data, wherein the dictionary function is assigned when a first sub-actor is 'feature' and a second sub-actor is 'changeable' or 'nonChangeable' and a data type as 'categorical' or 'Date', and the dictionary function is assigned when the first sub-actor is 'feature' and the second sub-actor is 'NonTarget', a third sub-actor is 'SubFeature' and the data type as 'categorical' or 'Date', wherein the sumOf function is assigned when the first sub-actor is 'feature' and the second sub-actor is 'changeable' or 'nonChangeable' and data type as 'continuous', the SumOf function is assigned when the first sub-actor is 'feature' and the second sub-actor is 'Non-Target', the third sub-actor is 'SubFeature' and the data type as 'continuous', wherein a NeverOccured function is assigned when the first sub-actor is 'feature' or 'product', the second sub-actor is 'changeable' or 'nonChangeable', and the data type as 'Boolean', wherein the one or more functions are selected automatically depending on the actor, the sub-actors and the data type;

invoking, via the one or more hardware processors, the generated one or more functions to generate a feature vector set specific to the one or more corresponding data comprised in the plurality of datasets, wherein each of the selected one or more functions when invoked is applied on the data characterized in the generated meta file and automated as a script invoking appropriate functions mentioned in 'data meta file' for every data element in a data row iteratively over every row; and training, via the one or more hardware processors, one or more machine learning models using the feature vector set and re-using the data meta model and abstracting the dataset provides insights about the data, layer of abstraction allows performing feature engineering and writing code independent of the dataset, and by using the data meta model, new data elements are incorporated and removed whenever necessary by changing the mapping between data columns to the data meta model.

2. The processor implemented method as claimed in claim 1, further comprising creating a library with the generated one or more functions; and periodically updating the created library based on one or more subsequent datasets being received for the feature engineering and training the machine learning models.

3. The processor implemented method as claimed in claim 1, further comprising creating a library of the data meta model and subsequent data meta models being generated based on one or more subsequent datasets being received specific to the one or more domains.

4. A system, comprising:

a memory storing instructions;

one or more communication interfaces; and one or more hardware processors coupled to the memory via the one or more communication interfaces, wherein the one or more hardware processors are configured by the instructions to:

obtain a plurality of datasets from a plurality of sources, wherein the plurality of datasets corresponding to one or more domains;

generate a meta file based on a mapping of the dataset obtained from the plurality of sources to actors and sub-actors in a data meta model that is identified based on the one or more domains and describing a domain-specific meta model and specifics of the domain is handled by introducing sub-actors in the domain-specific meta model, wherein the actors and the sub-actors capture specificities of the plurality of datasets and the sub-actors include features-changeable representing changeable attributes of a customer, and features-fixed representing fixed attributes of the customer, wherein the actors include user with a unique ID, action, entity and context of two types including temporal referring to a time stamp at which the action happened between the customer and the entity, and non-temporal includes a device to perform the action, wherein the meta file comprises meta data and information pertaining to one or more specific actions being performed, wherein the meta data refers to date type, categorical type, data from data column to which the actor and the sub-actor is mapped, Boolean, and continuous;

generate one or more functions using the generated meta file and assign the generated one or more functions to one or more corresponding data characterized in the generated meta file, wherein the one or more functions denotes a code or a procedure used over the data column, wherein the one or more functions includes sumOf, Window, wherein the sumOf function maintains a cumulative count of data present in the data column, the Window function creates an aggregate count of data values for a specified time window of a time duration including an hour, a day, a fortnight, a season, a festival duration, the Window function works on categorical data values, and an output of the Window function is key value pairs wherein the key is data item and the value is an aggregate occurrence count of said data item during the specified time window, and a Dictionary function is similar to the Window function, and applied over whole duration of data, wherein the dictionary function is assigned when a first sub-actor is 'feature' and a second sub-actor is 'changeable' or 'nonChangeable' and a data type as 'categorical' or 'Date', and the dictionary function is assigned when the first sub-actor is 'feature' and the second sub-actor is 'NonTarget', a third sub-actor is 'SubFeature' and the data type as 'categorical' or 'Date', wherein the sumOf function is assigned when the first sub-actor is 'feature' and the second sub-actor is 'changeable' or 'nonChangeable' and data type as 'continuous', the SumOf function is assigned when the first sub-actor is 'feature' and the second sub-actor is 'NonTarget', the third sub-actor is 'SubFeature' and the data type as 'continuous', wherein a NeverOccured function is assigned when the first sub-actor is 'feature' or 'product', the second sub-actor is 'changeable' or 'nonChangeable', and the data type as 'Boolean', wherein the one or more functions are selected automatically depending on the actor, the sub-actors and the data type;

invoke the generated one or more functions to generate a feature vector set specific to the one or more corresponding data comprised in the plurality of datasets, wherein each of the selected one or more functions when invoked is applied on the data characterized in the generated meta file and automated as a script invoking appropriate functions mentioned in 'data meta file' for every data element in a data row iteratively over every row; and train one or more machine learning models using the feature vector set and re-using the data meta model and abstracting the dataset provides insights about the data, layer of abstraction allows performing feature engineering and writing code independent of the dataset, and by using the data meta model, new data elements are incorporated and removed whenever necessary by changing the mapping between data columns to the data meta model.

5. The system as claimed in claim 4, wherein the one or more hardware processors are further configured by the instructions to:

create a library with the generated one or more functions; and periodically update the created library based on one or more subsequent datasets being received for the feature engineering and training the machine learning models.

6. The system as claimed in claim 4, wherein the one or more hardware processors are further configured by the instructions to create a library of the data meta model and subsequent data meta models being generated based on one or more subsequent datasets being received specific to the one or more domains.

7. One or more non-transitory machine-readable information storage mediums comprising one or more instructions which when executed by one or more hardware processors cause data meta-model-based feature vector set generation for training machine learning models by:

obtaining a plurality of datasets from a plurality of sources, wherein the plurality of datasets corresponding to one or more domains;

generating a meta file based on a mapping of the plurality of datasets obtained from the plurality of sources to actors and sub-actors in a data meta model that is identified based on the one or more domains and describing a domain-specific meta model and specifics of the domain is handled by introducing sub-actors in the domain-specific meta model, wherein the actors and the sub-actors capture specificities of the plurality of datasets and the sub-actors include features-changeable representing changeable attributes of a customer, and features-fixed representing fixed attributes of the customer, wherein the actors include user with a unique ID, action, entity and context of two types including temporal referring to a time stamp at which the action happened between the customer and the entity, and non-temporal includes a device to perform the action, wherein the meta file comprises meta data and information pertaining to one or more specific actions being performed, wherein the meta data refers to date type, categorical type, data from data column to which the actor and the sub-actor is mapped, Boolean, and continuous;

generating one or more functions using the generated meta file and assigning the generated one or more functions to one or more corresponding data characterized in the generated meta file, wherein the one or more functions denotes a code or a procedure used over the data column, wherein the one or more functions includes sumOf, Window, wherein the sumOf function maintains a cumulative count of data present in the data column, the Window function creates an aggregate count of data values for a specified time window of a time duration including an hour, a day, a fortnight, a season, a festival duration, the Window function works on categorical data values, and an output of the Window function is key value pairs wherein the key is data item and the value is an aggregate occurrence count of said data item during the specified time window, and a Dictionary function is similar to the Window function, and applied over whole duration of data, wherein the dictionary function is assigned when a first sub-actor is 'feature' and a second sub-actor is 'changeable' or 'nonChangeable' and a data type as 'categorical' or 'Date', and the dictionary function is assigned when the first sub-actor is 'feature' and the second sub-actor is 'NonTarget', a third sub-actor is 'SubFeature' and the data type as 'categorical' or 'Date', wherein the sumOf function is assigned when the first sub-actor is 'feature' and the second sub-actor is 'changeable' or 'nonChangeable' and data type as 'continuous', the SumOf function is assigned when the first sub-actor is 'feature' and the second sub-actor is 'Non-Target', the third sub-actor is 'SubFeature' and the data type as 'continuous', wherein a NeverOccured function is assigned when the first sub-actor is 'feature' or 'product', the second sub-actor is 'changeable' or 'nonChangeable', and the data type as 'Boolean', wherein the one or more functions are selected automatically depending on the actor, the sub-actors and the data type;

invoking the generated one or more functions to generate a feature vector set specific to the one or more corresponding data comprised in the plurality of datasets, wherein each of the selected one or more functions when invoked is applied on the data characterized in the generated meta file and automated as a script invoking appropriate functions mentioned in 'data meta file' for every data element in a data row iteratively over every row; and training one or more machine learning models using the feature vector set and re-using the data meta model and abstracting the dataset provides insights about the data, layer of abstraction allows performing feature engineering and writing code independent of the dataset, and by using the data meta model, new data elements are incorporated and removed whenever necessary by changing the mapping between data columns to the data meta model.

8. The one or more non-transitory machine-readable information storage mediums of claim 7, wherein the instructions which when executed by the one or more hardware processors further cause:

create a library with the generated one or more functions; and periodically update the created library based on one or more subsequent datasets being received for the feature engineering and training the machine learning models.

9. The one or more non-transitory machine-readable information storage mediums of claim 7, wherein the instructions which when executed by the one or more hardware processors further cause creating a library with the generated one or more functions, and periodically updating the created library based on one or more subsequent datasets being received.

* * * * *